United States Patent

[11] 3,574,401

| [72] | Inventor | Wilhelm Lehner<br>Kummersbrucker-Strasse 6, Amberg,<br>Oberpfalz, Germany |
|---|---|---|
| [21] | Appl. No. | 769,966 |
| [22] | Filed | Oct. 23, 1968 |
| [45] | Patented | Apr. 13, 1971 |
| [32] | Priority | Oct. 23, 1967 |
| [33] | | Germany |
| [31] | | P 16 30 736.1 |

[54] DRIVER'S SEAT FOR MOTOR VEHICLES
16 Claims, 17 Drawing Figs.

[52] U.S. Cl. .................................................. 297/453,
297/308, 297/452, 297/403
[51] Int. Cl. ..................................................... A47c 7/20,
A47c 7/14
[50] Field of Search ........................................... 297/308,
340, 345, 452—457

[56] References Cited
UNITED STATES PATENTS

| 2,285,112 | 6/1942 | Dorton ........................ | 297/403X |
| 3,139,304 | 6/1964 | Lehner et al. ................ | 297/345X |
| 3,170,730 | 2/1965 | Beckman et al. ............ | 297/454X |
| 3,205,008 | 9/1965 | Murray et al. ............... | 297/452 |
| 3,230,012 | 1/1966 | Beckman et al. ............ | 297/445 |
| 3,326,603 | 6/1967 | Lehner ........................ | 297/308 |
| 3,331,089 | 7/1967 | Ovnas, Jr. et al. .......... | 297/453 |
| 3,441,315 | 4/1969 | Paes et al. .................... | 297/458 |

FOREIGN PATENTS

| 1,018,951 | 2/1966 | Great Britain ............... | 297/458 |

*Primary Examiner*—Casmir A. Nunberg
*Attorney*—Fleit, Gipple & Jackson

ABSTRACT: A driver's seat for motor vehicles, preferably for self-propelled implements, such as agricultural tractors, is provided with upholstery on the seat proper and on the backrest. The upholstery is composed of a plurality of independent individual pads.

PATENTED APR 13 1971

INVENTOR
WILHELM LEHNER

BY
Stevens, Davis, Miller & Mosher
ATTORNEYS

PATENTED APR 13 1971 3,574,401

INVENTOR
WILHELM LEHNER

BY
*Stevens, Davis, Miller & Mosher*
ATTORNEYS

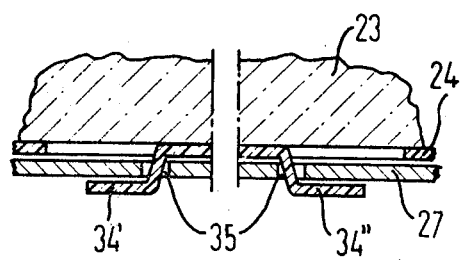
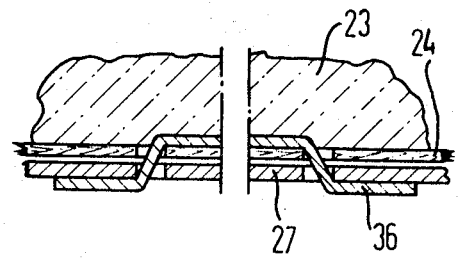
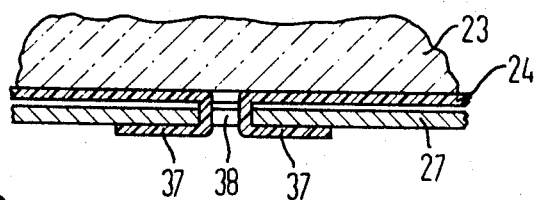
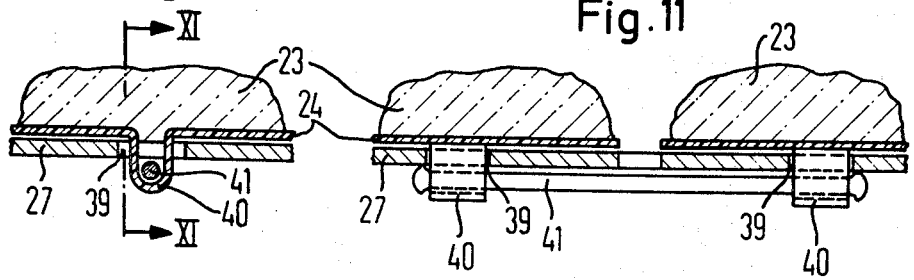
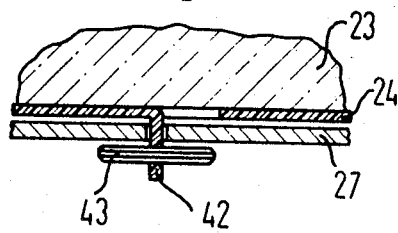

INVENTOR
WILHELM LEHNER
BY
Stevens, Davis, Miller & Mosher
ATTORNEYS

DRIVER'S SEAT FOR MOTOR VEHICLES

This invention relates to a driver's seat for motor vehicles, preferably for self-propelled implements, such as agricultural tractors, which seat is provided with upholstery on the seat proper and on the backrest.

The known driver's seats are provided with upholstery in which the spring cores or shaped foam elements of the entire upholstery are faced by a single cover. Such an integral upholstery has a number of drawbacks.

Because the covers consist in most cases of plastics material, the seat cannot be aerated at all. The same applies to leather upholstery. Other covers too do not enable an adequate aeration, even if pipes are sewn or heat-sealed into the cover.

An upholstery which hugs the body of the driver can be provided only with difficulty because the cover must be applied without wrinkles and the initial stress of the cover eliminates to a large extent the shape previously imparted to the upholstery.

It was not possible so far to replace new individual parts for worn ones. Particularly with agricultural tractors and commercial vehicles, a large wear of the upholstery, particularly of the covers, has been observed in the areas which are contacted by the thighs.

It is an object of the invention to provide a driver's seat which avoids the above-described disadvantages of the known driver's seats. This object is accomplished by the invention in a driver's seat of the kind described hereinbefore in that the upholstery is composed of a plurality of independent pads. The individual pads are suitably disposed one beside the other and the seat proper and/or backrest is perforated between the individual pads. The upholstery according to the invention comprising individual pads enables a true circulation of air because the individual pads of the seat proper and/or backrest are arranged one directly beside the other or with a spacing of, e.g., 10—12 millimeters. The spaces between the pads extend as far as to the supporting surface of the seat proper and/or backrest. If the seat proper and/or backrest is perforated between the individual pads, the aeration will be promoted, water will be drained and condensation will be prevented. A further advantage of the upholstery according to the invention comprising individual pads resides in that the upholstery on the seat proper and/or backrest can be adapted to the anatomy of the respective driver in that correspondingly shaped individual pads are selected and assembled. The upholstery provided by the invention and assembled from individual pads also gives a better cushioning (damping) effect than the known integral upholstery. Finally, the upholstery comprising individual pads enables a repair of the driver's seat by an insertion of new individual pads, regardless where wear has occurred, and an adaptation of the upholstery to the anatomy of a different driver.

In an embodiment of the invention, the individual pads are easily replaceably secured to the seat proper and/or backrest. This affords the advantage that the repair or replacement of the individual pads of the driver's seat can be effected by the driver himself and it is not necessary to bring the driver's seat or the whole vehicle to a repair shop. Thus, the invention provides a driver's seat having a much higher utility.

It has proved particularly desirable to provide individual pads consisting of a foam part, a baseplate, preferably of plastics material, and a cover which is secured to the baseplate. In a development of this feature of the invention, the baseplate of the individual pad is secured in a hole of the seat proper and/or backrest by a shaped element of spring steel or plastics material. In this case, the shaped elements of the individual pad can be forced in a simple manner into the corresponding holes of the seat proper and/or backrest and the hole and the shaped element are so matched that the individual pad will be reliably held but can easily be replaced when the required effort is applied.

In another development of the invention, the shaped element has a longitudinal aperture for an aeration of the individual pad. This feature will ensure an air supply to each individual pad and will prevent condensation.

In a preferred embodiment of the driver's seat according to the invention, the baseplate has four shaped elements and the cover has four fixing tongues, which overlap on the baseplate and have preferably punched fixing holes, through which the shaped elements extend.

If the seat proper and backrest of the driver's seat according to the invention consist of separate parts, protection for the back and kidney regions of the driver will be afforded according to the invention in that a guard plate extends upwardly from the seat proper. This feature as well as the previously described improvements of the driver's seat according to the invention serve to provide a health-promoting seat such as is particularly required in modern agriculture.

In order to protect the individual pads as far as possible from the influence of the weather or from being soiled and damaged when the vehicle is being repaired, the invention, as applied to a driver's seat comprising a rocker arm, which is pivoted at one end to the forward end of the seat proper and at the other end to the forward end of an L-shaped mounting frame serving to attach the seat to the driver, and a carrying frame for the seat proper and the backrest, provides that the backrest is detachably secured to the carrying frame by a hook and the seat proper and the backrest are pivotally movable by means of the rocker arm above the steering wheel and/or upwardly and rearwardly and subsequently forwardly. This affords the further advantage that space is afforded for getting into the vehicle and/or for assembling and repair work and that the vehicle can also be operated by a standing driver. To this end, an individual pad may be provided on the forward lower edge of the seat.

Finally, it is contemplated by the invention that the uppermost individual pad of the backrest can be folded down rearwardly. This affords the advantage that this individual pad can be provided as an additional pad and in a vertical position can serve as a head pad which forms an extension to the backrest. This arrangement will not render the control of the attached implements mounted on agricultural tractors more difficult because the pad can be folded down to the rear for this purpose.

The invention will be explained by way of example hereinafter with reference to the drawing, in which:

FIG. 1 is a top plan view showing the driver's seat according to the invention.

FIGS. 2—12 show embodiments of the means for fixing an individual pad to the seat.

Figure 1:
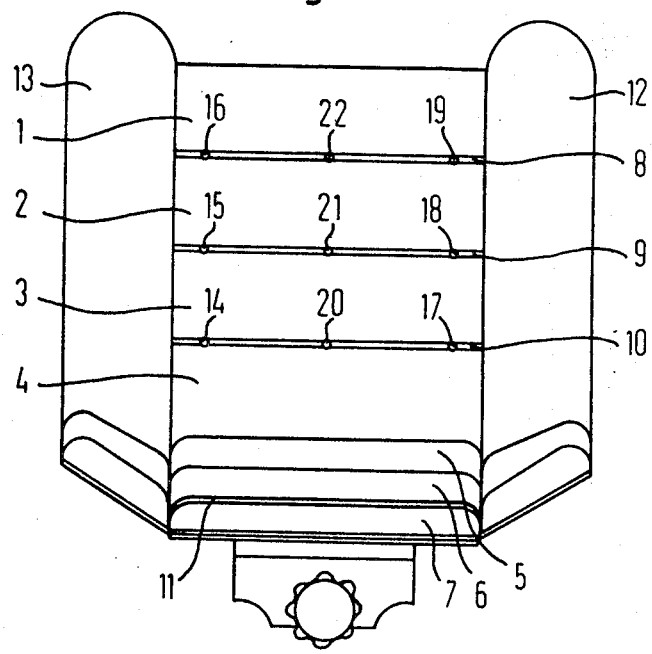

According to FIG. 1, the upholstery of the seat proper is composed of individual pads 1 to 4 and the upholstery of the backrest is also composed of individual pads, of which pads 5 to 7 are apparent from the drawing. Spaces 8 to 10 are left between the individual pads 1 to 4 of the seat proper. Such spaces are also provided between the individual pads 5 to 7; of the latter spaces, the space 11 is apparent from the drawing. Whereas the previously described individual pads extend in a transverse direction, the outer individual pads 12, 13 of the driver's seat extend in the longitudinal direction and have raised portions forming vertical thigh supports as well as armrests. It will be found most desirable to provide the seat proper at its forward end with a transversely extending individual pad and longitudinally extending individual pads are provided at the ends of said transverse pad. The remaining seat area is provided with longitudinally extending individual pads. On the backrest, the outer pads extend preferably in the longitudinal direction and the intermediate pads extend in the transverse direction.

The seat proper is perforated between the individual pads. The holes 14 to 23 are apparent from FIG. 1.

Figure 2:
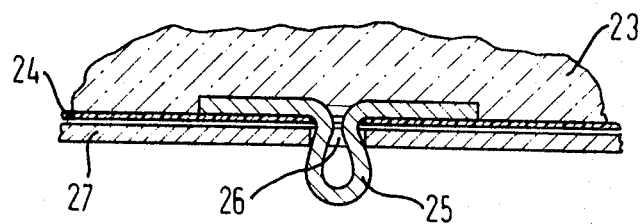

As is apparent from FIG. 2, each individual pad consists of a foam part 23, a baseplate 24 and a cover, which is secured to the baseplate. The baseplate may consist of wood, metal or plastics material. Plastics material is preferred. The baseplate is provided with a shaped element 25, which is inserted in a hole 26 of the seat or seat bucket 27.

Figure 3:
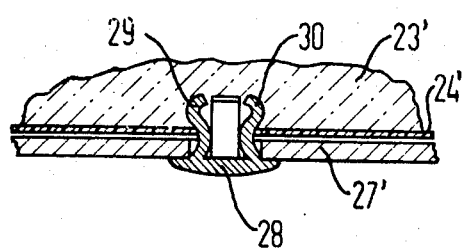

FIG. 3 shows different means for securing the individual pad. The shaped element consists of a button 28 of plastics material, which comprises resilient portions 29, 30. The drawing shows a shaped foam part 23', a baseplate 24' and a seat proper of seat bucket 27'.

Figure 4:
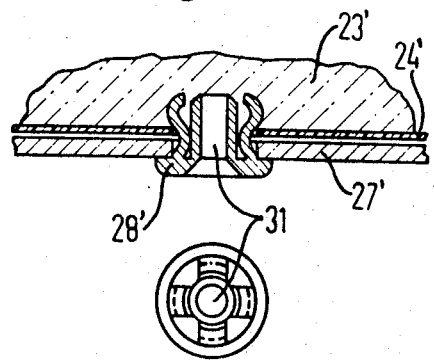

The embodiment shown in FIG. 4 differs from that in FIG. 3 only in that the button 28' of plastics material serving as a shaped element is provided with a longitudinal bore 31.

Figure 5:
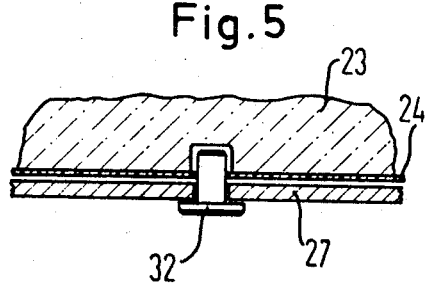

In the embodiment shown in FIG. 5, the shaped element consists of a rivet 32.

Figure 6:
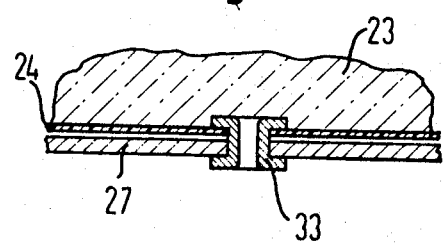

In FIG. 6, the fixing element consists of a hollow rivet 33, which is upset at both ends and extends through respective holes in the baseplate 24 and in the seat proper or seat bucket 27.

The peculiar feature of the fixation illustrated in FIG. 7 resides in that the shaped element is integral with the baseplate. The baseplate consists of plastics material and has lanced tongues 34', 34'', which extend through respective holes 35 in the seat proper or seat bucket 27.

In the embodiment shown in FIG. 8, the baseplate 24 consists of wood or metal and the shaped element consists of a double tongue 36 of spring steel.

In the embodiment shown in FIG. 9, the baseplate consists of sheet metal or plastics material. Tongues 37 lanced from the baseplate extend outwardly through a hole 38 and are reversely bent on the seat proper or seat bucket 27.

As is apparent from FIGS. 10 and 11, the baseplate has eyes 40, which extend through holes 39 and through which a wire 41 of metal or plastics material is threaded so that means for interconnecting a plurality of individual pads are provided on the other side of the seat proper or seat bucket 27.

FIG. 12 shows a fixing arrangement in which a tongue 42 having a hole is lanced from the baseplate and a locking pin 43 is passed through said hole.

Figure 13:
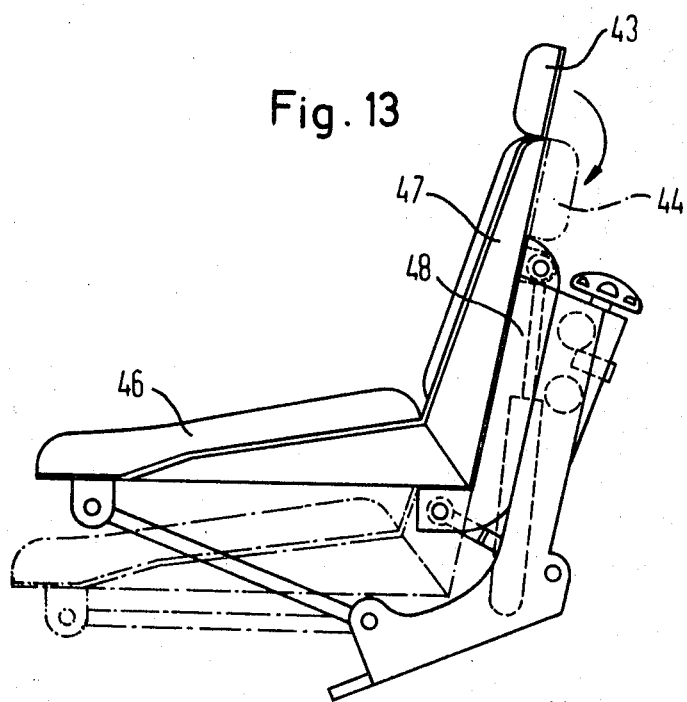
FIG. 13 shows a driver's seat according to the invention having an additional pad which can be swung down.

As is apparent from FIG. 13, the uppermost individual pad 43 of the backrest can be folded down to the rear to the position 44. In its extended position, this individual pad forms a headrest. When folded down, as shown at 44, it enables a convenient control of the implements which are mounted on agricultural tractors.

Figure 14:
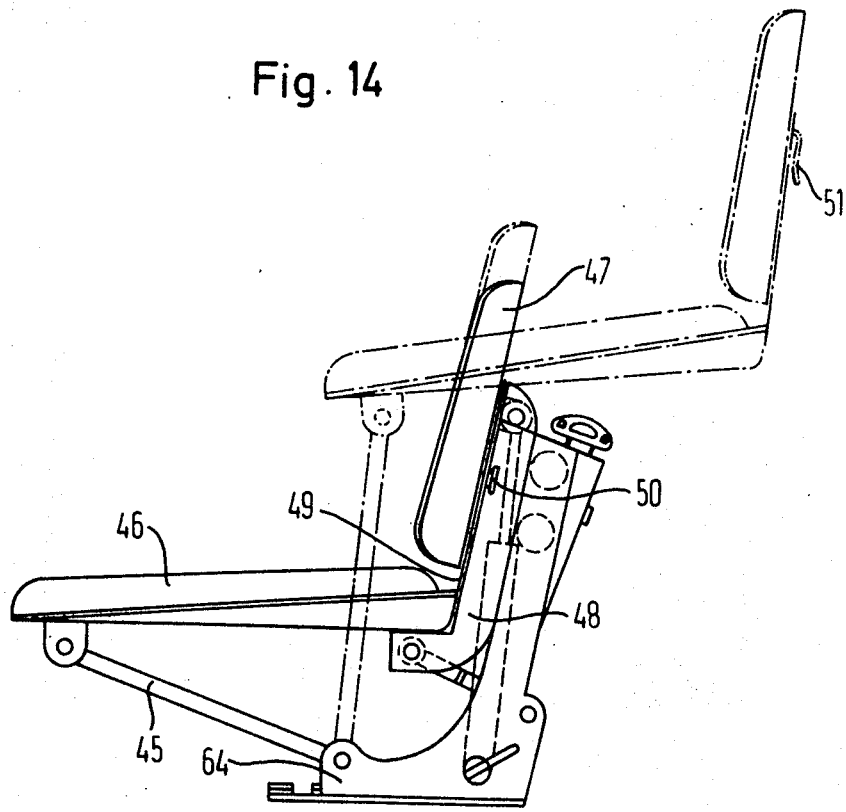
FIG. 14 shows a driver's seat according to the invention in which the seat and backrest are separate.

It is apparent from FIG. 14 that the driver's seat is provided with a rocker arm 45, which is pivoted at one end to the forward end of the seat proper 46 and at the other end to the forward end of an L-shaped mounting frame 64, which serves to connect the seat to the vehicle. The driver's seat further comprises a carrying frame 48 for the seat proper 46 and the backrest 47. In this embodiment, the seat proper 46 and the backrest 47 are separate, whereas in the embodiments shown in FIGS. 13 and 15 they form an integral driver's seat. For the protection of the back and kidney regions of the driver, a guard plate 49 extends upwardly from the seat 46. The backrest 47 is secured to the plate 49 by a screw 50 so as to enable an adjustment in height.

Figure 15:
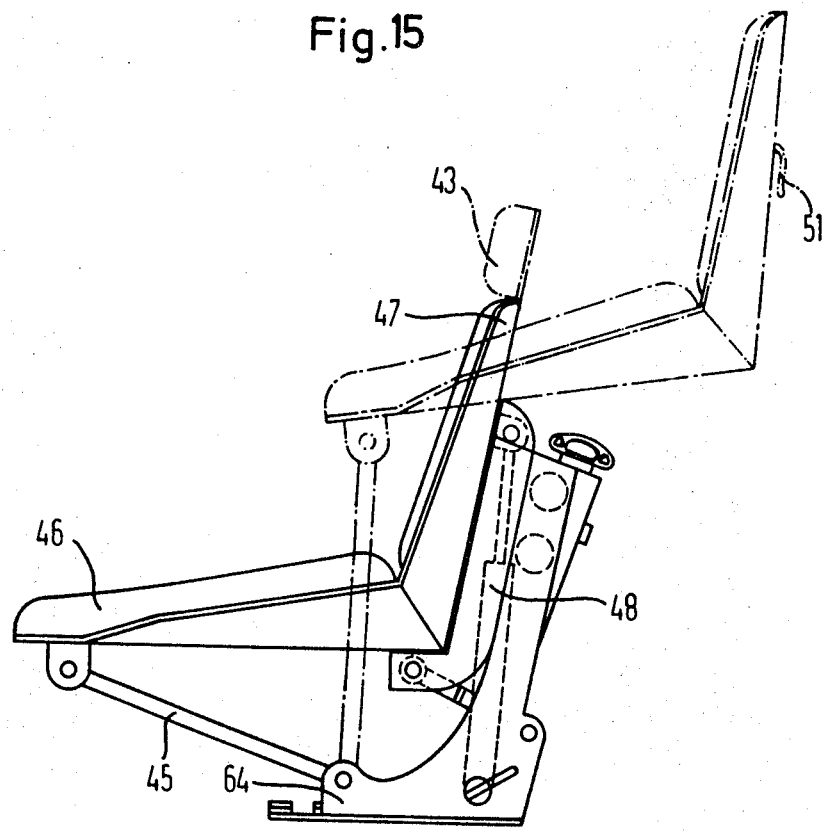
FIG. 15 illustrates the pivotal movements of the driver's seat according to the invention.

As is apparent from FIG. 15, the backrest 47 is detachably secured to the carrying frame 48 by a hook 51. The seat proper 46 and the backrest 47 are pivotally movable by means of the rocker arm 45 over the steering wheel 52 and the gearshift lever 53 forwardly to the position shown in dash-dot lines or upwardly and rearwardly and, if desired, thereafter forwardly to the other positions shown in dash-dot lines, about the pivot which connects the rocker arm 45 to the forward end of the seat 46.

Figure 16:
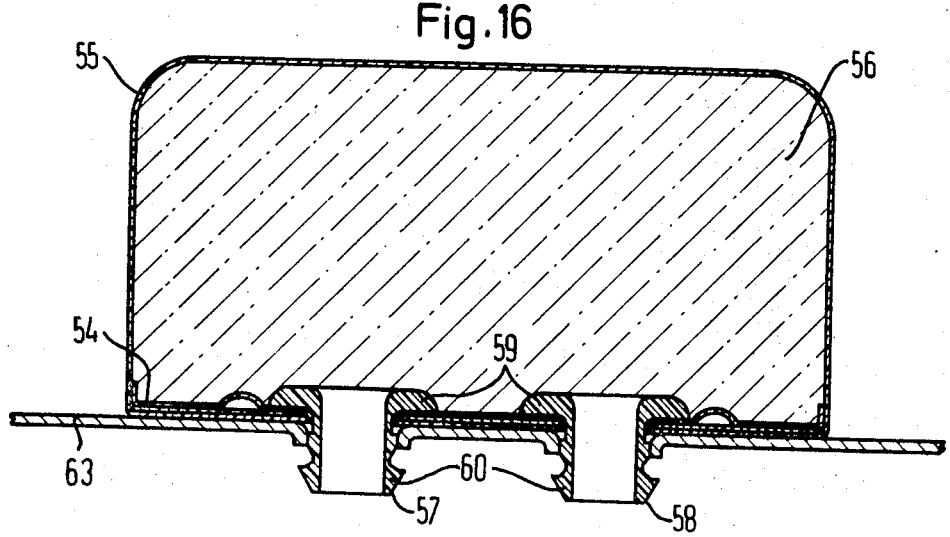
FIG. 16 illustrates one preferred embodiment of the seat pad and means for attaching the pad to the seat proper.
Figure 17:
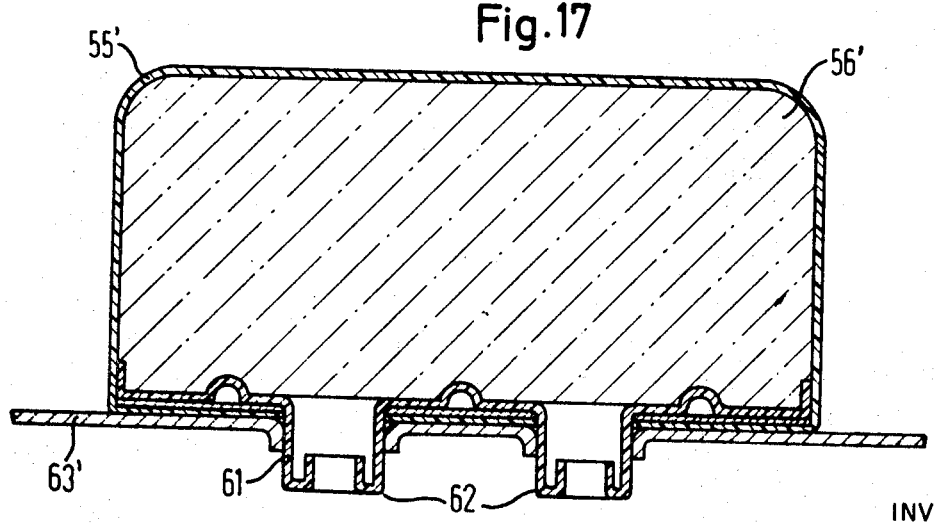
FIG. 17 illustrates a second preferred embodiment of the seat pad and its means for attachment.

FIGS. 16 and 17 show two preferred embodiments of individual pads according to the invention.

In FIG. 16, the individual pad comprises a baseplate 54 of sheet metal, a cover 55 and a foam core 56. The baseplate is provided with four plugs, which consist of plastics material. These plugs constitute shaped fixing elements. The shaped elements 57, 58 are apparent from the drawing. The plugs, such as 57, 58, are formed with reinforced flanges 59 at the end which is disposed in the individual pad and with conical enlargements 60 at the opposite end. These enlargements enable the shaped elements to be forced through the holes in the seat proper but prevent the plugs from being forced out of the seat plate.

The embodiment of FIG. 17 differs from the embodiment shown in FIG. 16 essentially in that the baseplate 61 consists of plastics material and the shaped elements 62 are integral with the baseplate. The individual pads are secured to the seat proper, which is designated 63 in FIG. 16 and 63' in FIG. 17.

I claim:

1. A driver's seat for automotive vehicles, particularly for agricultural working machines, the seat comprising: a seat shell; a seat back; a plurality of independent and distinct pad sections provided on said seat back and serving as upholstery therefor, said pad sections being apart from each other so that air channels are formed therebetween, thereby allowing for free circulation between said pad sections; and means for maintaining the spacing between said pad sections.

2. A driver's seat according to claim 1, characterized in that the upholstery comprises a plurality of transverse pads and a plurality of longitudinal pads.

3. A driver's seat according to claim 1, characterized in that the seat and/or the backrest is perforated between the individual pads.

4. A driver's seat according to claim 1, characterized in that the pads are detachably secured to the seat proper and/or the backrest.

5. A driver's seat according to claim 1, characterized in that each pad consists of a shaped foam part, a baseplate preferably of plastics material, and a cover, said cover being secured to the baseplate.

6. A driver's seat according to claim 5, characterized in that the baseplate of each pad is secured in a hole defined in the seat proper and/or in the backrest by a shaped resilient element.

7. A driver's seat according to claim 6, characterized in that the baseplate has four shaped elements and the cover has four fixing tongues, which tongues overlap on the baseplate and have punched fixing holes, through which said shaped elements extend.

8. A driver's seat according to claim 6, characterized in that the shaped element has a longitudinal aperture for the aeration of the associated pad.

9. A driver's seat according to claim 6, characterized in that the shaped element is integral with the baseplate.

10. A driver's seat according to claim 1, characterized in that the plurality of pads are secured in place by means disposed on the side of the seat proper and/or backrest remote from said pads.

11. A driver's seat according to claim 1, characterized in that the uppermost pad of the backrest includes means for being folded down in a rearward direction.

12. A driver's seat according to claim 1 in which the seat proper and the backrest are independent units, characterized in that a guard plate extends upwardly from the seat proper and serves to protect the back and kidney regions of the driver.

13. A driver's seat according to claim 12, characterized in that the backrest is secured to the guard plate so as to be adjustable in height.

14. A driver's seat according to claim 1 and further comprising: a rocker arm pivoted at one end to the forward end of the seat proper and at the other end to the forward end of an L-shaped mounting frame, said mounting frame serving to attach the seat to the vehicle; and a carrying frame for mounting the seat proper and the backrest, characterized in that the backrest is detachably secured to the carrying frame by a hook and that the seat proper and the backrest are pivotally movable by means of the rocker arm above the steering wheel and/or upwardly and rearwardly and subsequently forwardly.

15. A driver's seat according to claim 6, characterized in that the baseplate is provided with a plurality of shaped elements consisting of plugs of plastics material, wherein each of said plugs has one end disposed in an associated pad and is provided with a reinforced flange and wherein the opposite end of each of said plugs is formed with a conical enlargement.

16. A driver's seat according to claim 1, wherein the distance between the section pads is between 10 and 12 millimeters.